United States Patent [19]

Oestergren

[11] 3,828,917
[45] Aug. 13, 1974

[54] DIRECTION REVERSING DEVICE FOR TRANSPORT EQUIPMENT
[75] Inventor: Henrik William Stig Oestergren, Enskede near Stockholm, Sweden
[73] Assignee: Aktiebolaget Fredr. Wagner, Stockholm, Sweden
[22] Filed: Dec. 27, 1972
[21] Appl. No.: 319,081

[30] Foreign Application Priority Data
  Jan. 11, 1972  Sweden.............................. 275/72

[52] U.S. Cl............................................ 198/127 R
[51] Int. Cl............................................ B65g 13/02
[58] Field of Search... 198/127 R; 193/35 MD, 35 B

[56]  References Cited
  UNITED STATES PATENTS
  3,682,284  10/1970  Sakamoto..................... 198/35 MD FOREIGN PATENTS OR APPLICATIONS
211,992  4/1967  Sweden.......................... 198/127 R Primary Examiner—Richard E. Aegerter

[57]  ABSTRACT

A direction reversing or changing device, especially for transporting or conveying equipment for piece goods or materials, such as plates, newspaper bundles, cardboard or the like, comprising a number of balls forming a conveying surface for the materials. The balls are mounted to be rotatable in all directions, and are driven in random directions with the aid of an adjustable drive mechanism arranged beneath each ball.

12 Claims, 10 Drawing Figures

DIRECTION REVERSING DEVICE FOR TRANSPORT EQUIPMENT

BACKGROUND OF THE INVENTION

The present invention relates broadly to the art of material handling equipment and, more specifically, concerns a new and improved construction of direction reversing or changing device for use with transporting or conveying equipment for the handling of different types of goods or materials.

In installations equipped with conveying or transporting equipment for the conveying of materials or articles, for instance at airport terminals, central distribution stations for newspapers and the like, the situation often arises that it is desired to convey the articles from a main conveying path in a direction, for instance, which is essentially perpendicular thereto. One possibility of achieving this result is to arrange lateral conveying devices which merge with the main conveying path at suitable branch locations, and thus together with the main conveying path form a right-angle cross arrangement. In this cross-arrangement there is provided a device for transferring the goods arriving at the main conveying path on to the branched conveying paths, wherein as a general rule there should be provided the possibility of selective distribution of the materials or articles being handled.

There are already known to the art different pieces of equipment of the aforementioned type. Two independent elevationally displaceable systems of rollers with roller planes corresponding to the desired directions of movement and with reversible rotational directions can be provided, for instance, at the branch-off locations, and at the height of the band conveyors. A different solution which has enjoyed considerable success comprises synchronously driven and likewise synchronously rotatable guide rollers. However, the known pieces of equipment are mechanically quite complicated and therefore also relatively expensive to fabricate. They also are associated with certain limitations as concerns the possibility of directing the handled goods or materials.

SUMMARY OF THE INVENTION

Hence, it is a primary object of the present invention to provide an improved construction of direction reversing device for material transporting equipment which is not associated with the aforementioned drawbacks and limitations of the prior art proposals.

Another and more specific object of the present invention relates to a new and improved construction of direction reversing device wherein it is possible, with the aid of relatively simple mechanical means, to bring about directional changes or reversal of the materials or the like being conveyed and which in certain aspects cannot be realized with the prior art equipment.

Yet a further significant object of the present invention relates to an improved construction of apparatus for selectively reversing the direction of travel of materials or goods being handled in a material conveying or transporting system and wherein the direction reversing apparatus is relatively simple in construction, extremely reliable in operation, economical to manufacture, requires a minimum of servicing and maintenance, and is not readily subject to breakdown or malfunction.

Now in order to implement these and still further objects of the invention, which will become more readily apparent as the description proceeds, the invention contemplates the provision of a number of balls or spheres which form a conveying surface for the handled materials, these balls being mounted so as to be universally rotatable, in other words, rotatable in all directions, and such balls can be rotatably driven in random directions with the aid of an adjustable drive mechanism arranged beneath each ball.

Owing to this construction of direction reversing device, it is possible to convert in a very simple fashion the rotational direction of the balls, that is to say, to alter the conveying direction of the handled materials or articles, and, if desired, to simultaneously also influence in an advantageous manner during the direction change-over, the rotational speed of the balls.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 1:
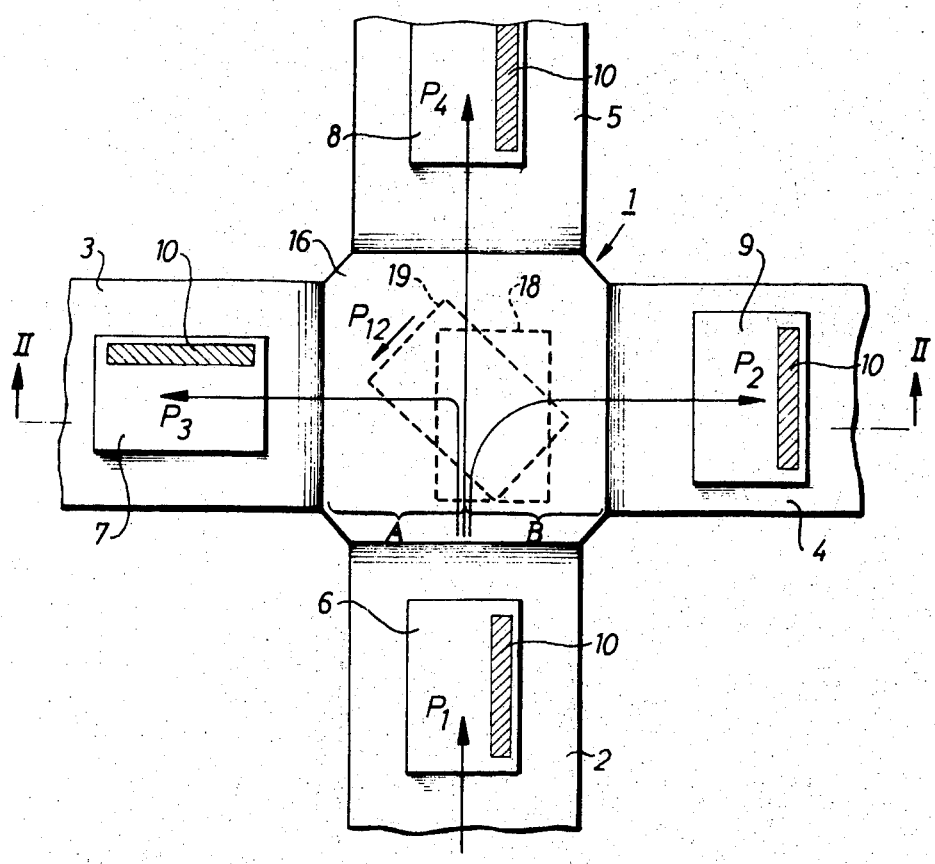
FIG. 1 is a schematic plan view of a direction reversing device used in conjunction with a main band conveying mechanism and three lateral band conveying mechanisms associated therewith.

Describing now the drawings, in FIG. 1 there is illustrated a preferred exemplary constructional embodiment of direction reversing or changing device 1 at the cross-over or intersection point between main conveyor or transporting device 2 for the incoming materials, goods or articles, and three lateral band conveyors or transporting devices 3, 4, 5 for such materials, goods or articles, which are distributed in different selective directions by such direction reversing device 1. By way of example, the handled materials, goods or articles, hereinafter simply referred to as materials, have been depicted by way of example in FIGS. 1 and 2 in the form of newspapers stacked together into bundles, the momentary position of which as concerns the description of the operation to be given hereinafter, has been indicated at one edge thereof by the respective crosshatched zone 10.

Figure 2:
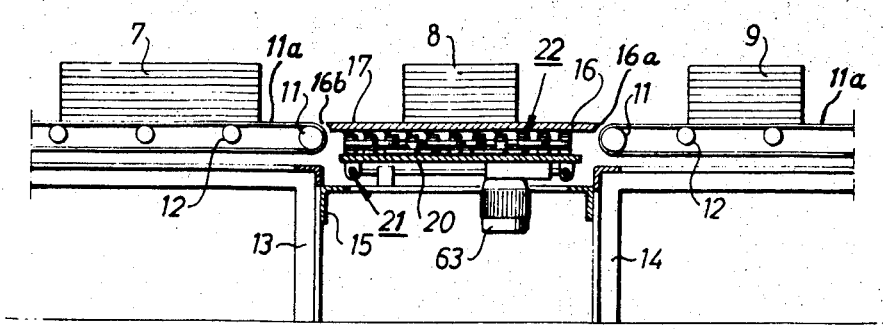
FIG. 2 is a sectional view of the arrangement of FIG. 1, taken substantially along the line II—II thereof.

The band conveying or transporting devices 2, 3, 4 and 5 in known manner possess endless bands or belts 11a which are arranged at drive rollers 11 and support rollers 12, as best seen by referring to FIG. 2. The drive rollers 11 and the support rollers 12 are mounted upon supports 13, 14, at which there is also attached a frame or housing 15 which carries the direction reversing or changing device 1.

Now this direction reversing device 1 is arranged in such a manner between the band conveying devices 2, 3, 4 and 5 that a ball holding plate member 16 which is essentially square or rectangular in shape merges by means of its outer straight edges 16a at the associated band conveying devices 2–5 such that only a narrow gap 16b prevails between each such associated conveying device and the corresponding edges 16a of the ball holding plate member 16. This ball holding plate member 16 is rigidly connected with the frame or housing 15 and is located with its upper surface 17 approximately at the plane of the corresponding upper surface of the band conveying devices 2, 3, 4 and 5. This in effect means that the newspaper bundles 6, 7, 8 and 9 can be displaced without any essential change in their elevational position from the primary or main band conveying device 2 onto the lateral band conveying device 5, wherein the displacement occurs by means of the relevant conveying device as long as the newspaper bundle is located thereon and by means of the direction reversing device 1 as soon as a newspaper bundle has been shifted from the main band conveying device onto such direction reversing device. In FIG. 1 there have been shown in phantom lines two different positions 18, 19 for a newspaper bundle located upon the direction reversing device 1, whereas at the same time different transportation or conveying directions for the newspaper bundles have been designated by the arrows $P_1$, $P_2$, $P_3$, and $P_4$. The aforementioned positions and conveying directions will be considered more fully hereinafter.

Beneath the ball holding plate member 16 and essentially parallel thereto, there are arranged upon a mounting or support plate member 20 one or a number of systems 22 of drive plate or disk units. The mounting plate member 20 is displaceable in its own plane relative to the ball holding member 16 in the main directions of the band conveying device, that is to say, in the direction of the arrows $P_1$, $P_2$, $P_3$ and $P_4$ respectively. For this purpose, there is provided a guide mechanism 21 for the mounting plate member 20, and which will be considered more fully in conjunction with the description of FIG. 6 to be given hereinafter.

Figure 3:
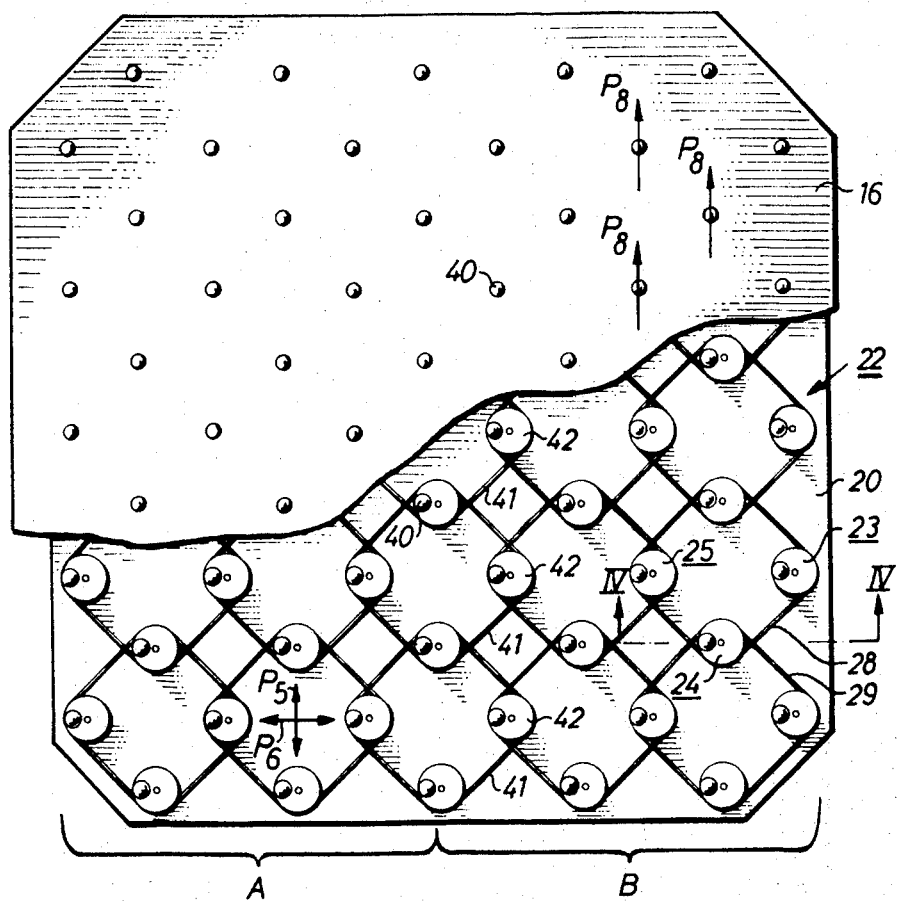
FIG. 3 is an enlarged view, in horizontal projection, and schematically showing the direction reversing device of FIGS. 1 and 2 incorporating a ball holding plate equipped with balls and a mounting plate member arranged beneath such ball holding plate and displaceable in a horizontal plane, the mounting plate member possessing drive disks or plates arranged in a certain pattern, there also being shown the drive belts for these drive disks or plates.
Figure 4:
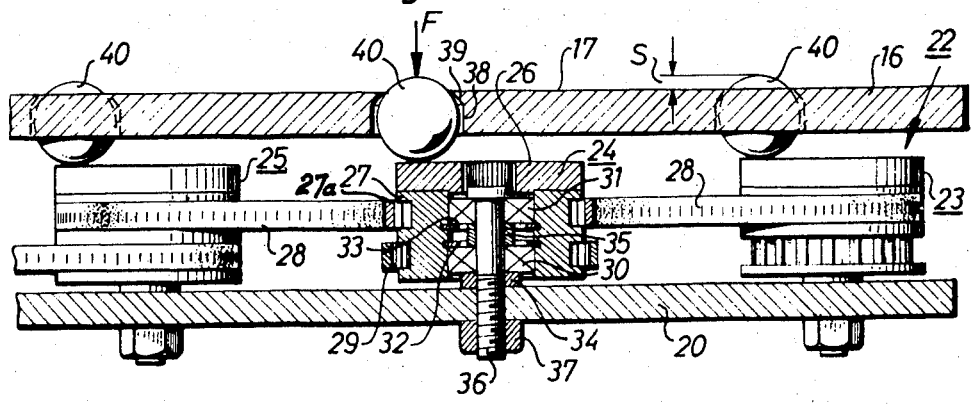
FIG. 4 is an enlarged cross-sectional view of the direction reversing device depicted in FIG. 3, taken substantially along the line IV—IV thereof.

Each drive plate unit encompasses an upper disk or plate 26, for instance advantageously formed of a hardened material with a ground surface as well as a toothed belt hub or wheel 27 with grooves 27a for two toothed belts 28 and 29, as best seen by referring to FIGS. 3 and 4. The toothed belt hub 27 is anchored to the mounting plate 20 through the agency of two ball bearings 30 and 31 which are held in spaced relationship from on another by grooved ring members 32 and 33 and a spacer sleeve 35 as well as a screw 36 equipped with a nut member 37 and which screw serves as a journal or pivot pin. The disk 26 is fixedly connected with the toothed belt hub 27.

As best seen by referring to FIG. 3, the drive plate units 22 are connected with one another in groups of four always through the agency of a toothed belt. Each belt thus forms a square having a toothed belt hub in each corner, wherein neighboring belts overlap at the end regions and are trained about one and the same toothed belt hub.

This means that by rotating a given toothed belt hub or driving a given toothed belt, all of the toothed belt hubs and therefore all of the drive plates or disks of the entire system 22 are synchronously driven.

Now apertures or holes 38 which are arranged in a square pattern or grid arrangement with the same distribution or spacing as the center point of the drive plate are provided at the ball holding plate member 16. The pattern or grid arrangement, as best seen by referring to FIG. 3, can be diagonally oriented or along the central line of the ball holding plate member 16.

The holes 38 are tapered or narrowed at the region of the top surface 17 of the ball holding plate member 16 by means of overhanging bevelled or chamfered portions 39 and a ball or sphere member 40 is mounted in each hole 38, each such ball being retained with play, in other words, so as to be freely rotatable, in the fitting or mounting formed by the hole 38 and the cooperating bevelled portions 39. Now as best seen by referring to FIG. 4, each ball or sphere member 40 which protrudes past the surface 17 of the ball holding plate member 16 by the distance or height S is eccentrically supported upon its associated drive plate or disk member 26. This is also the case when the balls are subjected to a load F, for instance by a part of the weight of a newspaper bundle which has been pushed onto the material direction reversing device 1.

It was previously stressed that the ball holding plate member 16 is fixedly mounted in the frame or housing 15, and that the mounting plate member 20 is movable in relation to the ball holding plate member 16 in the directions indicated by the doubleheaded arrows $P_5$, $P_6$ (FIG. 3) and corresponding to the directions indicated by the arrows $P_1$, $P_4$, and $P_2$, $P_3$, of FIG. 1. The arrangement is undertaken such that each ball 40 in the rest positions of the mounting plate member 20 assumes a respectively different eccentric roller position at the associated drive plate or disk (see arrows $R_1$–$R_4$ of FIG. 5).

Figure 5:
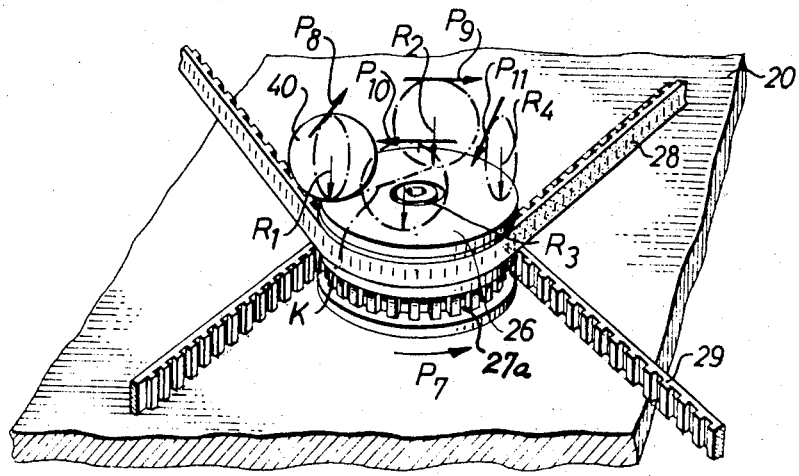
FIG. 5 is a perspective view of a drive plate or disk with two drive belts and a ball, wherein there is simultaneously also shown in phantom lines three other possible positions of the ball with respect to the drive plate or disk.

Now if according to the showing of FIG. 5, the disk 26 rotates in the direction of the arrow $P_7$, then the ball 40, depending upon its momentary roller position, rotates in such a manner that there is imparted to the material supported thereon, a driving action in the direction of one of the arrows $P_8 - P_{11}$.

In the illustration of the mounting plate member 20 of FIGS. 3 and 4 respectively, the roller position corresponds to the arrow $R_1$ of FIG. 5. Since all of the balls 40 are located in the same relative position with respect to their associated drive plate or disk, all of the balls will displace an object or article located thereon in the direction of the arrow $P_8$ of FIG. 3. A newspaper bundle 6, which has been displaced by the main band conveying device 2 onto the material direction reversing device 1 (FIG. 1) will, for this roller position, move straight ahead past the direction reversing device 1 and then will be taken over for further conveying by the lateral conveying or transport device 5.

Now, when the mounting plate member 20 is positionally shifted such that a roller position according to the arrow $R_2$ of FIG. 5 is realized, then the newspaper bundle 6 will be driven by all of the ball members 40 in the direction indicated by the arrow $P_9$, that is to say, in a direction which corresponds to the direction of the arrow $P_2$ for the lateral conveying device 4 (FIG. 1). If a newspaper bundle is to be transferred to the last-mentioned lateral conveying device, then the mounting plate member 20 is shifted from the roller position $R_1$ into the roller position $R_2$ as soon as the newpaper bundle is located with its entire lower surface upon the material direction reversing device 1. This shifting or conversion action occurs in a certain period of time, wherein the contact points between the ball 40 and the disk 20 are located in a row along an essentially straight line in the form of a chord K (FIG. 5). It should be clear that the roller velocity of the balls 40 varies during movement along the chord K, and that at the center point of the chord it is smallest. As a result, the newspaper bundle while being parallelly displaced describes a relatively wide arc. This is of considerable advantage since sudden or abrupt directional changes can cause sliding movements and inclined positions for the newspaper bundles. The parallel displacement means that the newspaper bundle will assume the same position at the lateral transporting or conveying device 4 (compare the position of the phantom depicted zone 10 of FIG. 1) which it had when it was upon the main conveying or transporting device.

In corresponding manner, it is possible by shifting the mounting plate member 20 from the roller position $R_1$ to the roller position $R_3$ (FIG. 5) to displace the newspaper bundle onto the lateral conveying device 3. In the last-mentioned position all of the balls 40 will drive the newspaper bundle in the direction of the arrow $P_{10}$ which corresponds to the direction of the arrow $P_3$ (FIG. 1).

However, in certain instances, it can be advantageous to turn the newspaper bundle about its own vertical or elevational axis. This can be realized in that the system 22 of drive plates can be subdivided into two or more groups with separate drives. FIG. 3 illustrates for instance a subdivision into two groups A and B, wherein each group is driven independently by a suitable non-illustrated motor or other prime mover. The toothed belt arrangements remain the same with the modification that a row of drive plates or disks neighboring the center line, for instance the drive plates 42, possess a non-driving, that is to say, free running belt disk or pulley over which travel the belts 41 belonging to group A. The drive plates or disks 42 therefore have imparted thereto the same direction of rotation as the drive plates or disks within the group B, whereas the remaining drive plates, as concerns their movement, belong to group A. It is to be observed that all of the drive plates, also with this type of constructional embodiment are likewise, as previously described, connected with one and the same mounting plate member 20 and that therefore change-over of the roller position simultaneously affects the entire system 22 of drive plates. On the other hand, the rotational speed of the balls 40 in both systems A, B can be influenced by the aforementioned motor drive.

If it is desired to displace a newspaper bundle out of the position 6 which such assumes at the primary or main conveying device 2, while simultaneously turning such into the position 7 at the lateral conveying or transporting device 3, then this can occur in the following manner: the newspaper bundle is parallelly displaced at the direction reversing device 1, wherein during this first phase the balls 40 are driven in the roller position $R_1$ (FIG. 5) with the same velocity for both groups A, B and the newpaper bundle moves in the direction of the arrow $P_8$. As soon as the newspaper bundle is completely located upon the direction reversing device 1, then the rotation of the balls in group A is delayed or stopped, whereas the balls or group B are driven with non-changed speed. The balls in group A therefore produce a braking force at one half of the lower surface of the bundle, as such has been depicted for intermediate position 19 by means of the arrow $P_{12}$ of FIG. 1. As soon as a 90° rotation has been carried out or shortly before, there is carried out a change-over of the roller position from $R_1$ to $R_3$, whereas at the same time there is imparted to the balls of group A the same rotational speed as the balls of group B. As a result, the newspaper bundle is displaced onto the conveying device 3 in the position 7.

Figure 6:
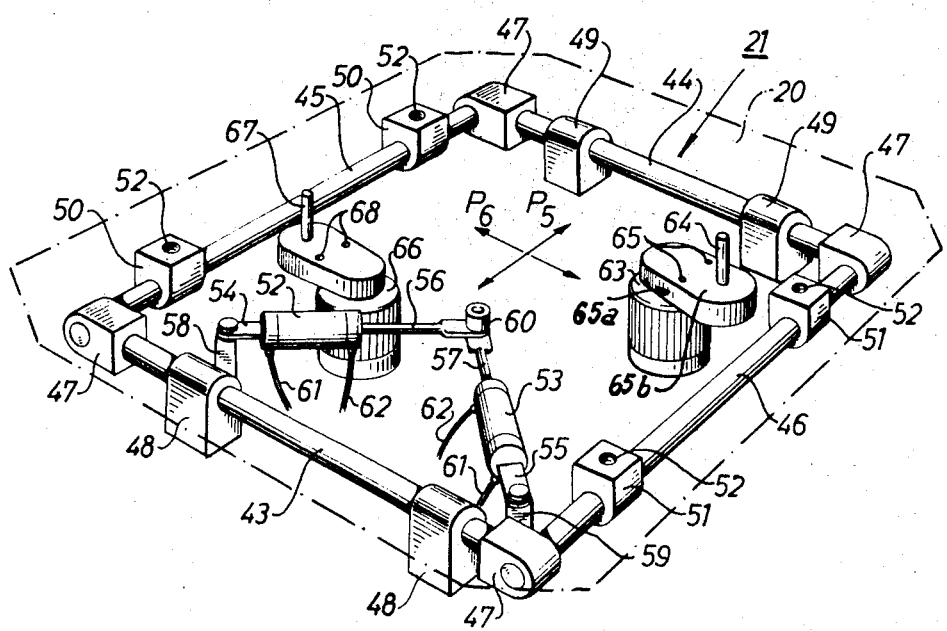
FIG. 6 schematically illustrates in perspective view the devices and elements for shifting the mounting plate member for the drive plates or disks into different desired positions, wherein the outline of a lower surface of the mounting plate has been indicated in phantom lines.

In FIG. 6, there is depicted for instance an exemplary embodiment of guide mechanism 21 with associated components for altering the position of the mounting plate member 20 and therefore the drive plate units 22 into the different roller positions $R_1$, $R_2$, $R_3$, and $R_4$. The guide mechanism 21 encompasses four pairwise parallelly arranged guide rods 43, 44 and 45, 46 which form a square or a rectangle, and which are connected with one another rigidly at their ends by the corner elements 47. At each guide rod there are mounted so as to be easily displaceable two respective sliding elements or blocks 48 – 51, as shown. The sliding elements 48 and 49 at the guide rods 43 and 44 respectively possess downwardly directed flat surfaces and are secured by non-illustrated screws from below at the frame 15 (FIG. 2). The guide elements or blocks 50 and 51 have upwardly directed flat surfaces with threaded holes 52 for receiving non-illustrated attachment screws, which engage in the mounting plate member 20 which has been depicted in broken or phantom outline in FIG. 6. Forces which influence the mounting plate member 20 in its horizontal plane, owing to the depicted guide mechanism, can among other things, displace the mounting plate member in the directions indicated by the double-headed arrows $P_5$ and $P_6$ (FIG. 5).

The adjustment forces for such displacements are generated by two lifting or displacement cylinders 52, 53 which are hingedly anchored by means of brackets 54, 55 and 58, 59 at the frame or housing 15. The free ends of the piston rods 56, 57 departing out of the lifting cylinders 52, 53 are hingedly connected by means of an entrainment pin 60 with the mounting plate member 20. The lifting cylinders 52, 53 can thus bring about displacements of the mounting plate member 20 with respect to the frame 15, and which will be considered more fully hereinafter in conjunction with the discussion of FIGS. 7 – 10. Each of the cylinders 52, 53 are provided in known manner with two air conduits 61 and 62.

For driving the system 22 of drive plates or disks, there is provided an electric motor 63 which is equipped with a speed reduction transmission 65a. The power take-off shaft 64 which is directed vertically upwards from the transmission housing 65b extends freely through a hole in the mounting plate member 20 and is rigidly connected for rotation with one of the toothed belt hubs 27 (FIG. 4). Threaded holes 65 in the transmission housing and non-depicted screws serve for anchoring the drive unit at the mounting plate member 20.

In the case of an embodiment employing two separate groups A and B (FIG. 3) of drive plates or disks, there is additionally mounted in suitable position an appropriate electric motor 66 with a power take-off shaft 67 and attachment holes or apertures 68, wherein such electric motor 66 drives the plate or disk group A and the electric motor 63, the plate or disk group B. The electric motors 63 and 66 have separate switching or control elements for carrying out switching-on and switching-off operations, reversing operations as well as for controlling the rotational speed.

In FIGS. 7 – 10 there is schematically illustrated the change-over into the four roller positions $R_1$, $R_2$, $R_3$, and $R_4$ by actuating the air cylinders 52 and 53, wherein the previously employed reference characters and arrows have been employed for the corresponding elements depicted in FIGS. 7 – 10 by symbols. There will be particularly recognized that the distance L to the center point C of a randomly selected disk or plate 26 is constant, and that the geometric position of the center point C is always the same in relation to the entrainment pin 60.

Figure 7:
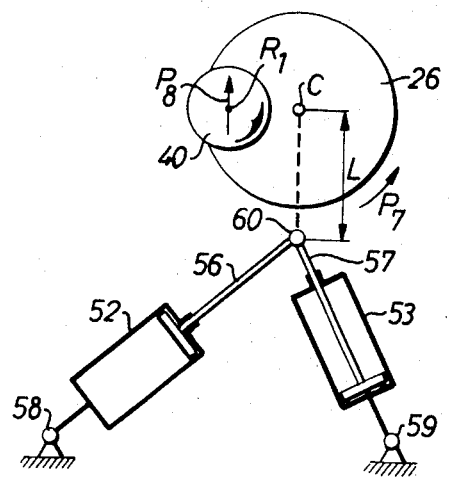
FIGS. 7 to 10 schematically depict four different relative positions which can be established between a ball and a drive plate as well as the different possible positions of two displacement or lifting cylinders employed for carrying out the shifting or repositioning of the mounting plate member according to the arrangement of FIG. 6.
Figure 8:
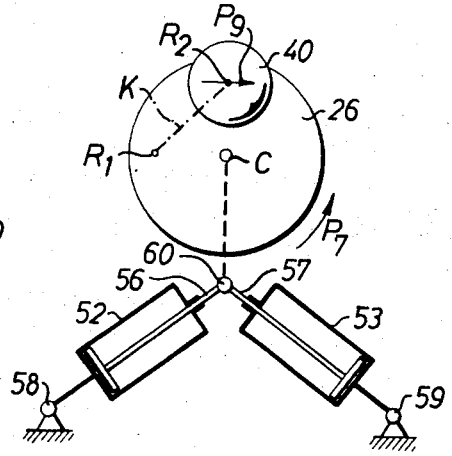
Figure 9:
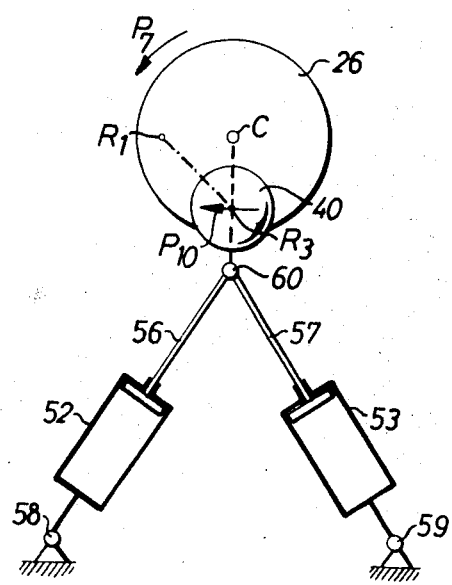
Figure 10:
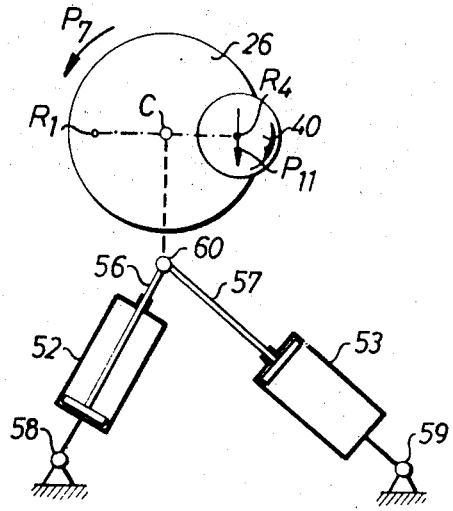

With a starting position according to FIG. 7, in which the ball 40 is located in the roller position $R_1$, the piston rod 56 of the cylinder 52 has been completely pushed out or ejected and the piston rod 57 of the cylinder 53 has been completely retracted. It is possible to arrive from this roller position $R_1$ at the roller position $R_2$ (FIG. 8) in that the delivery of air to the cylinder 52 is reversed, so that the piston rod 56 assumes the completely retracted position, whereas the piston rod 57 of the cylinder 53 remains in the previous retracted position. The device disk or plate 26 thus is shifted with respect to the ball 40 essentially along the chord K.

In corresponding manner, it is possible to attain from the roller position $R_1$ the roller position $R_3$ by actuating the cylinders 52 and 53 in such a manner that the piston rods 56 and 57 will be displaced into the completely pushed-out or ejected position.

During normal distribution of the materials from a primary or main conveying device 2 over three lateral conveying devices 3, 4 and 5, the three roller positions $R_1$, $R_2$, and $R_3$ are sufficient in order to realize the necessary distribution action of the articles or materials being handled. However, it is possible to conceive of situations in which transport of the materials should also occur opposite to the direction of the arrow $P_4$ of FIG. 1, that is, in the direction of the directional reversing device 1, wherein the roller position $R_4$ will be used. A change-over of, for instance, from the roller position $R_1$ into the roller position $R_4$ can be realized, as same has been clearly shown in FIG. 10, in that the delivery of air to the cylinders 52 and 53 is distributed such that the piston rod 56 is displaced completely towards the inside and the piston rod 57 is displaced completely towards the outside.

Actuation of the cylinders 52 and 53 and the electric motors 63, 66 can occur manually or automatically with the use of known control devices, wherein in the case of automatic control there can be provided in known manner signal transmitters which respond to the position of the newspaper bundle, preferably at the direction reversing device 1.

The described direction reversing device is formed of very simple mechanical components, as should be readily apparent from the description thereof as given herein. It is simple in construction and therefore inexpensive to fabricate as well as being extremely reliable in operation. Furthermore, it encompasses all of the article distribution possibilities which could arise at a piece of equipment of the type shown in FIG. 1. It is of course therefore obvious to possibly employ each of the four conveying devices 1, 2, 3, 4 as infeed tracks or paths of travel and the remaining ones as with withdrawal conveying paths, and specifically by the selection of the direction of travel of the transport bands and the roller positions of the balls 40.

It is also within the contemplation of the invention to of course employ different types of drives for the drive disks or plates.

Different constructional embodiments of the guide system 21 are likewise conceivable. The same also is true with respect to the displacement of the mounting plate member 20 into the different roller positions.

Of course, it would be possible to provide different arrangements for the balls and the drive plates or disks instead of a square or rectangular orientation which has been purely described by way of example in the disclosure of the invention and depicted in the drawings.

For realizing certain types of drives and for instance for centering the bundles t the direction at device, there could be provided two or more mounting plates 20, each of which carries one or more groups of drive disks or plates.

While there is shown and described present preferred embodiments of the invention, it is to be distinctly understood that the invention is not limited thereto, but may be otherwise variously embodied and practiced within the scope of the following claims.

Accordingly, what is claimed is:

1. A direction reversing device, especially for transporting equipment for different types of handled piece goods or materials, such as plates, newspaper bundles, cardboard or the like, comprising a number of balls forming a conveying surface for the handled material, means for mounting said balls so as to be rotatable in all directions, and an individual adjustable drive mechanism for each ball arranged beneath each ball for driving each of said balls in random directions.

2. A direction reversing device, especially for transporting equipment for different types of handled piece goods or materials, such as plates, newspaper bundles, cardboard or the like, comprising a number of balls forming a conveying surface for the handled material, means for mounting said balls so as to be rotatable in all directions, an adjustable drive mechanism arranged beneath each ball for driving said balls in random directions, said drive mechanism for each ball comprising a driven drive plate rotating essentially parallel to the conveying surface for the handled material, each ball being eccentrically supported upon its associated drive plate, and supporting means for each drive plate guided to be transversely displaceable at least in one direction with respect to the axis of rotation of the associated drive plate for mounting each associated drive plate.

3. The direction reversing device as defined in claim 2, further including means for coupling at least a number of said supporting means with one another.

4. The direction reversing device as defined in claim 3, wherein the intercoupled supporting means are supported at a mounting member.

5. The direction reversing device as defined in claim 3, wherein the balls and the intercoupled supporting means are arranged in rows which are parallel to one another and at least a number of drive plates are rotatably movably connected with one another by drive belts extending into and between the rows.

6. The direction reversing device as defined in claim 5, wherein each drive plate is connected by a drive belt with at least one neighboring drive plate of the same row and a drive plate of at least one neighboring row.

7. The direction reversing device as defined in claim 6, wherein each two neighboring drive plates of each row are connected with the neighboring two drive plates of a neighboring row by a drive belt, and wherein the drive belts are arranged in a substantially square formation and each engage about four drive plates and at their corners overlap in pairs the same drive plate.

8. The direction reversing device as defined in claim 6, wherein the drive plates are subdivided into two drive units to each side of a distribution line, and wherein the drive plates which follow one another along the distribution line are only in driving connection with the one drive belt which entrains such.

9. The direction changing device as defined in claim 4, further including a number of guide means arranged perpendicular to one another for guiding the mounting member.

10. The direction reversing device as defined in claim 9, further including at least two end stops provided for said guide means.

11. The direction reversing device as defined in claim 10, further including lifting element means positioned at an inclination with respect to one another and with respect to said guide means for displacing the mounting member.

12. The direction reversing device as defined in claim 11, wherein the end stops are constructed as stroke limiting stops for the lifting element means.

* * * * *